United States Patent
Staker et al.

(10) Patent No.: US 6,907,155 B2
(45) Date of Patent: Jun. 14, 2005

(54) THREE-DIMENSIONAL OPTICAL SWITCH WITH ANNULAR INPUT-OUTPUT PORTS

(75) Inventors: Bryan P. Staker, Pleasanton, CA (US); Eugene W. Campbell, Livermore, CA (US); Paul H. Pax, Hayward, CA (US)

(73) Assignee: Glimmerglass Networks, Inc.

( * ) Notice: Subject to any disclaimer, the term of this patent is extended or adjusted under 35 U.S.C. 154(b) by 150 days.

(21) Appl. No.: 10/271,668

(22) Filed: Oct. 15, 2002

(65) Prior Publication Data

US 2004/0071393 A1 Apr. 15, 2004

(51) Int. Cl.[7] ............................... G02B 6/35; G02B 6/28
(52) U.S. Cl. ............................. 385/18; 385/19; 385/24
(58) Field of Search ...................................... 385/16–24

(56) References Cited

U.S. PATENT DOCUMENTS

| | | | |
|---|---|---|---|
| 6,253,001 B1 | | 6/2001 | Hoen |
| 6,507,683 B2 | * | 1/2003 | Sugitatsu et al. .............. 385/18 |
| 6,587,611 B1 | * | 7/2003 | Hunt ............................. 385/18 |
| 6,690,885 B1 | * | 2/2004 | Aksyuk et al. ................ 398/45 |
| 6,728,016 B1 | * | 4/2004 | Hunt et al. .................. 359/223 |
| 2002/0164114 A1 | * | 11/2002 | Golub et al. ................... 385/18 |

* cited by examiner

*Primary Examiner*—Michelle R. Connelly-Cushwa
(74) *Attorney, Agent, or Firm*—Townsend and Townsend and Crew LLP; Kenneth R. Allen

(57) ABSTRACT

In a folded three-dimensional free-space optical switch including a set of fibers and an optical system for producing collimated beamlets aligned to intersect an array of dual axis micromirrors of coplanar input and output mirror elements, and a folding mirror, the input and output micromirrors are arranged in a pattern wherein either the input or output mirror set is disposed along an annulus and wherein the complementary output or input mirror set is disposed within the annulus in order to globally minimize maximum tilt angles for a two-dimensional locus of tilt angles of the micromirror set. The beamlets are routed from assigned input fibers to corresponding input moveable mirrors to assigned output fibers via the static folding mirror and corresponding output moveable mirrors.

13 Claims, 3 Drawing Sheets

THREE-DIMENSIONAL OPTICAL SWITCH WITH ANNULAR INPUT-OUTPUT PORTS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates to a cross-connect switch for fiber-optic communication networks. In particular, this invention relates to a compact, multi-channel free-space optical cross-connect whereby switching is accomplished by tilting pairs of dual-axis micromirrors.

Emergent communications systems use optical transmission through silica fibers using wavelength-division multiplexed (WDM) networks. As these systems evolve, requirements for reduced cost, form-factor, and power dissipation along with increased performance, scalability, and reliability become important in the design of efficient optical cross-connect systems. One particular type of optical cross-connect system utilizing dual-axis tilting micromirrors has been increasingly regarded as a technology which provides a solution to these constraints.

An example of prior art is Hoen, U.S. Pat. No. 6,253,001, which describes a free-space optical switch in which a plurality of collimated parallel beams is directed from a first two-dimensional fiber and lens array onto a first two-dimensional array of mirrors. Referring to FIG. 1, an unfolded optical switch 10 is shown as in Hoen having a collimator set 12, a first mirror set 14, a second mirror set 16, and a second collimator set 18. In a specific configuration, sets 12 and 14 are configured to be inputs and sets 16 and 18 are configured to be outputs. A non-blocking optical switch is formed by directing collimated light from input set 12 onto the first dual-axis micromirror set 14. Light from the first micromirror set 14 is redirected to the second micromirror set 16, which redirects light into output collimator set 18. For optimal coupling, each individual collimator is assigned to a corresponding individual micromirror, for instance collimators 20, 22, and 24 are assigned to micromirrors 30, 32, and 34. To achieve an arbitrary non-blocking switch, an input micromirror, such as 30, must be able to swivel through a full range of motion to access all output mirrors, such as 32 and 34.

By tilting any two mirrors on the input and output mirror arrays, a non-blocking N×N cross-connect switch is established. For an N-port system, 2N fibers, lenses, and mirrors are required.

The fabrication and actuation methods of the micromirror arrays are key drivers in system cost and complexity. The fabrication methods for the mirror arrays involve either assembling discrete components or creating the arrays in parallel using batch fabrication techniques. Assembly of discrete components is an option for lower port-count switches, but it is generally not considered to be an appropriate cost-effective fabrication technique for larger port-count switches. For larger port-count switches, batch processing using advanced microfabrication techniques is an attractive alternative. These devices are referred to as Micro-Electrical Mechanical Systems (MEMS). The actuation methods of the MEMS mirrors typically fall into two categories: electrostatic and electromagnetic. Electromagnetic operation is generally used for large, discrete mirrors, because of the large forces that can be obtained. However, electromagnetic forces do not scale well for micro-devices. Electromagnetic actuation is challenging due to cross talk resulting from the difficulty of confining magnetic fields. In addition, high continuous currents, hysteresis, and immature processing techniques of magnetic materials call into question the reliability of electromagnetic operation. These constraints make it difficult to engineer compact, low-power electromagnetically actuated mirror arrays.

Electrostatic forces scale well for micro-devices. Electrostatic actuation techniques fall into two major categories, comb-drive actuation and parallel-plate actuation. In the case of comb-drive actuation, comb-drive actuators develop forces between interdigitated combs that are located away from the mirror by the use of linkage elements, which are typically in contact with each other. Although this technique has the advantage of decoupling electrostatic forces from the mirror design, allowing conceivably lower voltages for a given force, there are several significant disadvantages. These disadvantages include issues of compactness, difficulty in manufacturing, difficulty in interconnection, and the potential for undesired contact with adjacent components and regions.

Parallel-plate actuation overcomes many of the limitations of the other actuation methods. This actuation method utilizes non-contacting structures where the electrostatic forces are developed between the mirror and the lower electrodes. This actuation method avoids the reliability issues associated with contact. With backside interconnects, it can be engineered to be compact. Because the actuation is electrostatic, it is also low-power. However this technique typically requires higher voltages.

With all actuation techniques, there are trade-offs between tilt angle, speed, voltage, and optical efficiency which make it desirable to limit the maximum tilt angle of the mirrors. For optical network restoration reasons, optical switches are typically required to have switching times on the order of 10 ms. Typical high port count free-space optical designs (at or above 64 ports) require the mirror tilt angle reproducibility to be on the order of 1 part in 10,000. Assuming mirrors with highly damped fundamental torsional modes of oscillation, a minimum switching time of approximately one oscillation period is theoretically possible. This results in mirrors with a minimum fundamental torsional resonant mode of about 100 Hz. It is difficult to maintain the stability required over the lifetime of a product. Even with a fully closed loop monitoring system, the calibration of the monitoring system can easily vary more than one part in 10,000.

As a result, optical monitoring of the coupled output power is generally required. A combination open-loop/closed-loop feedback system consisting of a single optical output power tap per output mirror may be used. In this system, mirrors are steered open-loop to a position where power is coupled into the output fiber, although it may not be optimally coupled. Once light has been coupled into the output fiber, the mirrors are positioned using servo control to maximize the efficiency of the coupled light. In this case, a much more reasonable mirror reproducibility of approximately 1 part in 100 is required, which has been demonstrated to fall well within the capabilities of electrostatically actuated MEMS devices. With closed loop operation, a minimum of 3 to 10 cycles is generally required to capture and servo to maximum power. Because of this, mirrors with a fundamental resonant mode of 300 Hz to 1 kHz are generally required to achieve 10 ms switching times.

The maximum tilt angle of a parallel-plate actuated MEMS device is closely coupled with the maximum voltage that may be applied between the electrodes. Trade-offs between tilt angle, resonant frequency, voltage, and optical efficiency make it desirable to minimize the tilt angles of the mirrors. For cost and compactness reasons, it is desirable to minimize the number of arrays used in the system. What is needed is a solution which minimizes the tilt angles of the micromirrors while still maintaining a compact, efficient, and cost-effective optical switch.

SUMMARY OF THE INVENTION

According to the invention, in a folded three-dimensional free-space optical switch including a set of fibers and an optical system for producing collimated beamlets aligned to intersect an array of dual axis micromirrors of coplanar input and output mirror elements, and a folding mirror, the input and output micromirrors are arranged in a pattern wherein either the input or output mirror set is disposed along an annulus and wherein the complementary output or input mirror set is disposed within the annulus in order to globally minimize maximum tilt angles for a two-dimensional locus of tilt angles of the micromirror set. The beamlets are routed from assigned input fibers to corresponding input moveable mirrors to assigned output fibers via the static folding mirror and corresponding output moveable mirrors. In a specific embodiment, input fiber and output fiber positions of the input/output array set are specified to be in an ovoidal pattern based on angle of departure of the nominal axis of the input/output beamlets from the nominal axis of the micromirror array set wherein the maximum tilt angle for a two-dimensional locus of tilt angles of the micromirror set is circular.

The invention will be better understood by reference to the following detailed description in connection with the accompanying drawings.

DESCRIPTION OF SPECIFIC EMBODIMENTS OF THE INVENTION

Figure 1:
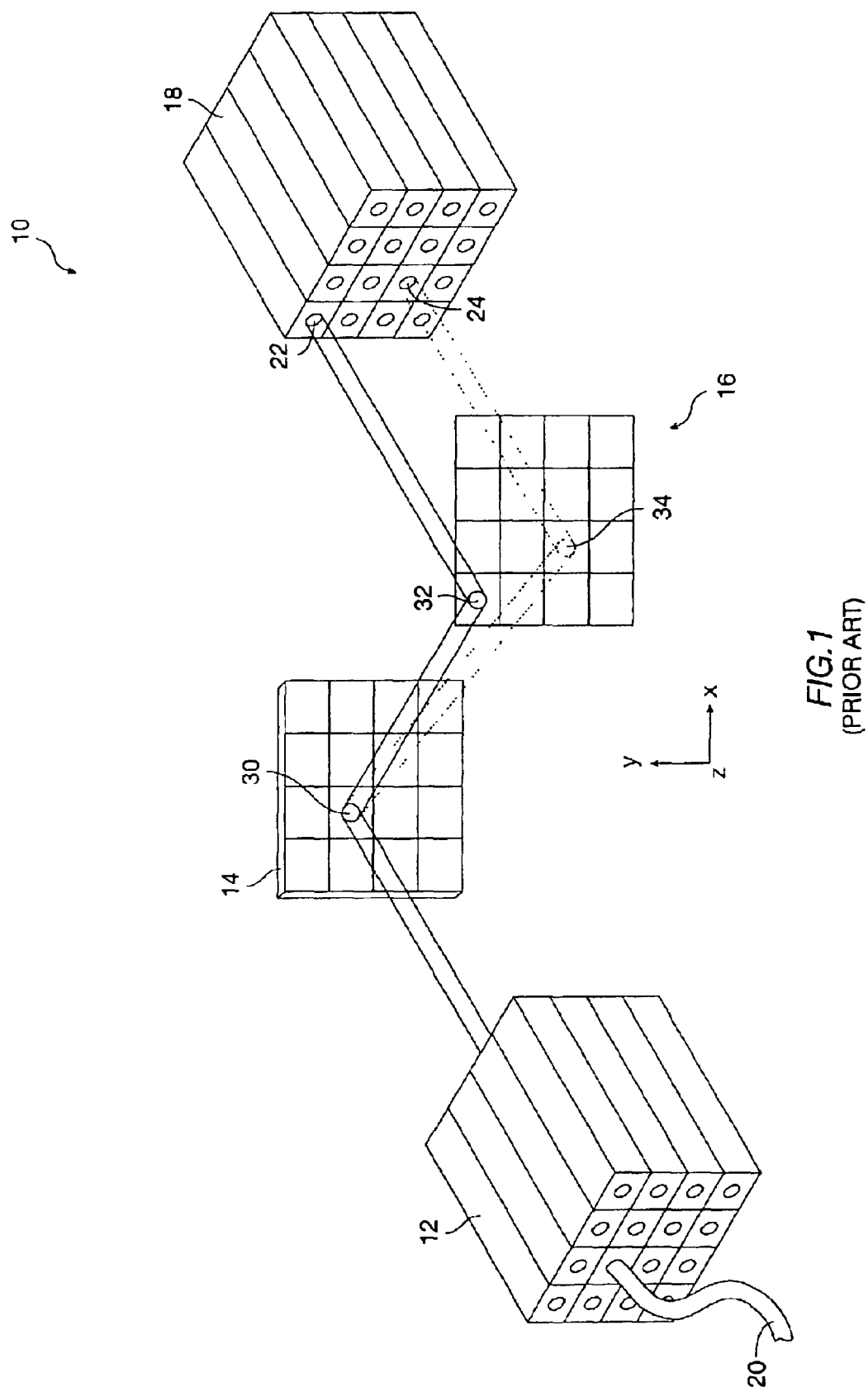
FIG. 1 is a perspective view of an unfolded free-space optical switch of the prior art.
Figure 2:
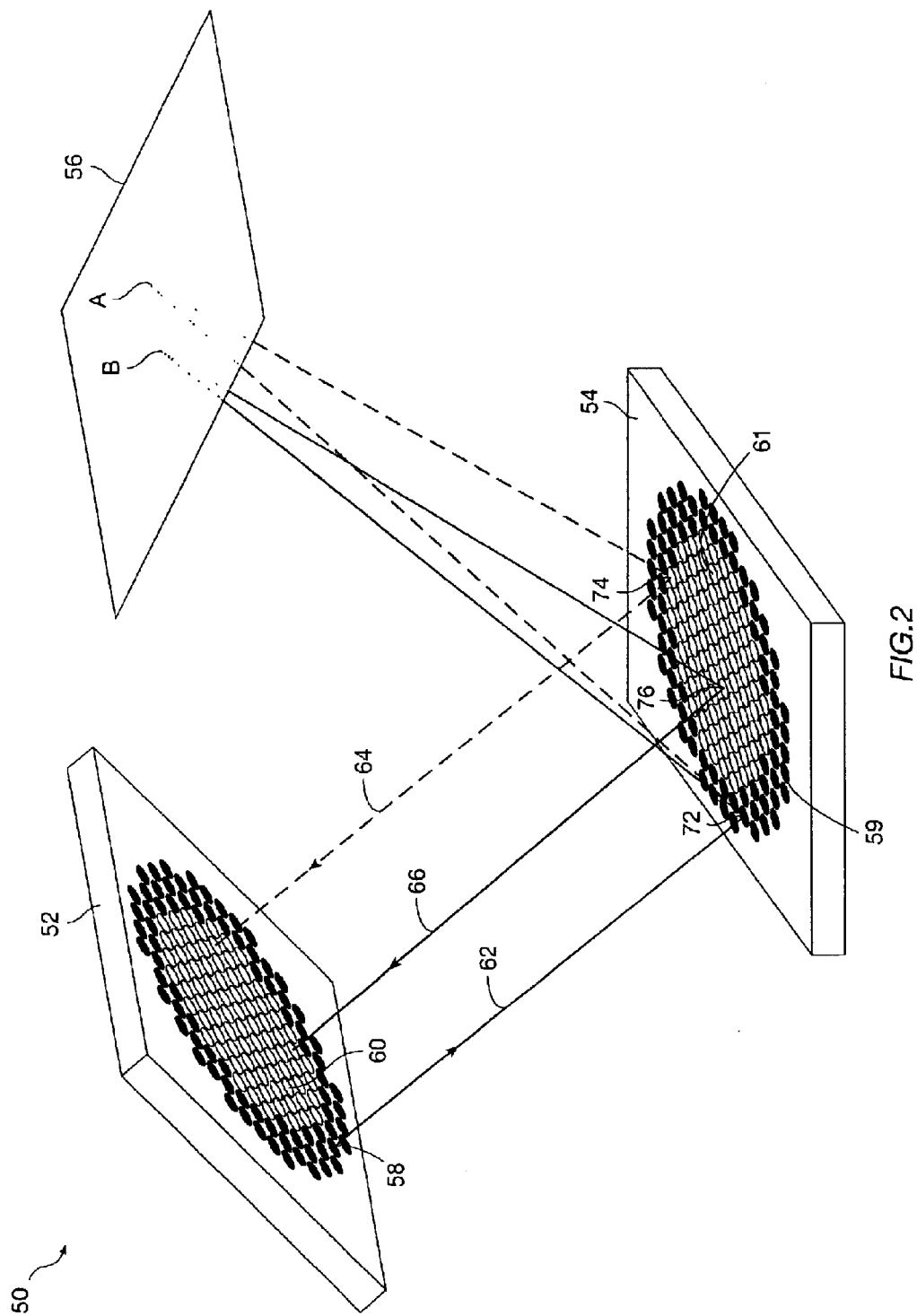
FIG. 2 is a perspective view of folded free-space optical switch according to the invention.

In FIG. 2, a folded optical switch 50 is shown according to the invention that comprises a collimated beamlet set 52, a micromirror set 54, and a fold mirror 56. For optimal coupling, each individual micromirror corresponds to an individual input collimator, preferably in parallel alignment. A first subset 58 of collimator set 52 is designated for inputs with a corresponding input micromirror subset 59. A second subset 60 of collimator set 52 is designated for outputs with a corresponding output micromirror subset 61. A nonblocking optical switch is realized by directing individual collimated beams through the folded beam path via the micromirror subsets 59 and 61. For example, input beamlet 62 is paired and routed to a corresponding micromirror 72. Micromirror 72 may steer a ray to reflect off the folding mirror 56 at point A back to individual output micromirror 74 to return as output beamlet 64 to the corresponding fiber of second subset 60. Alternatively, micromirror 72 may steer the ray to reflect off the folding mirror 56 at point B back to individual output micromirror 76 and thence as output beamlet 66 to the corresponding fiber of the second subset 60. Since there is a precalculation of tilt angle for a ray known to be received from a specified direction for a specified coupling, the output micromirror 74 or 76 will always direct a beamlet back to its corresponding fiber. This design is optimized for single-mode fibers to assure optimal coupling.

In order to minimize undesired maximum required tilt angles according to the invention, a preferential distribution of input micromirrors relative to output micromirrors is to enclose all micromirrors of a first array within an annular distribution area of micromirrors of a second array.

Figure 3:
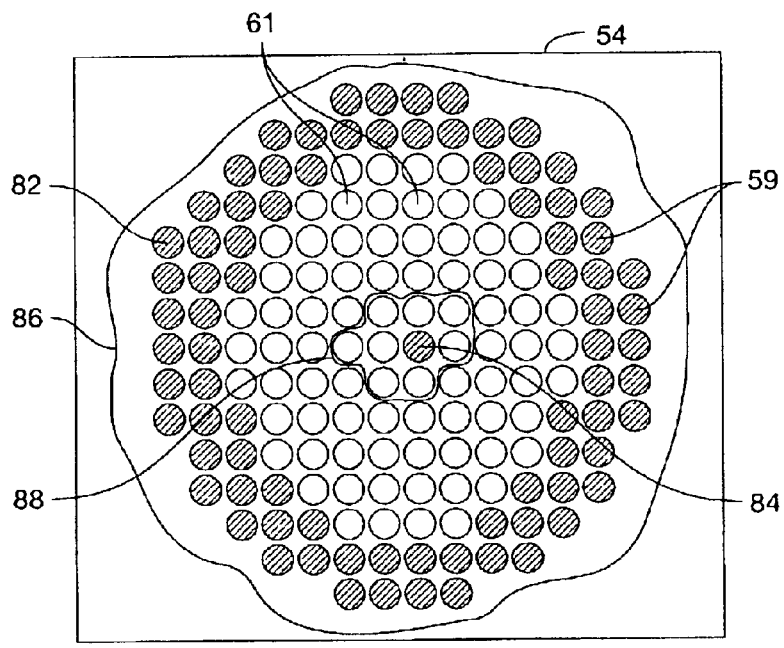
FIG. 3 is a top view of selected input/output mirrors of a folded system.

Referring to FIG. 3, the output micromirror subset 61 may be enclosed within the annular array of the input micromirror subset 59. It is understood that input and output are readily reversible. Since batch processing does not have a yield of 100%, it is important that the manufacturing process yield at least the minimum of one complete structure set for each port within each of the subset regions.

There is a theoretical optimal allocation and placement of input and output micromirrors for minimal tilt angle for both circularly symmetric locus of maximum tilt and circularly asymmetric (generalized) locus of maximum tilt of mirrors to optimize performance (e.g., switching speed, voltage, form factor). For mirrors with a circularly symmetric locus of maximum tilt, the shape of the preferred annular region is an ovoid subject to discretization, as shown in FIG. 3.

The maximum available tilt angle of a micromirror is not necessarily limited to a circular locus. Other constraints could include physical or electronic constraints, such as maximum voltage, maximum tilt angle, angular dependent resonant frequencies of the tilting mirrors, and maximum tilt-to-voltage variation sensitivity. These loci are generally reproducible from mirror to mirror and can be used to generate irregular annular loci that have minimized tilt angles based on a standard mirror loci representing a standard mirror.

Figure 4:
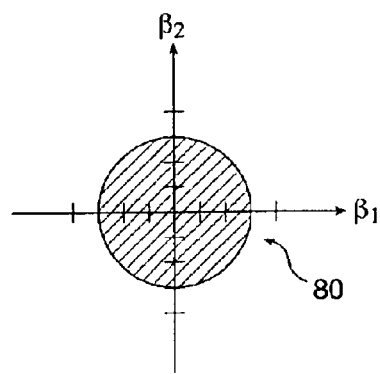
FIG. 4 is a graphical representation of a circular tilt angle locus of a single micromirror.

FIG. 4 illustrates a circular tilt angle locus 80 of a standard micromirror, where the $\beta 1$ axis and the $\beta 2$ axis represent the tilt angles about orthogonal directions. $\beta 1$ and $\beta 2$ are rotations about orthogonal axes in a Cartesian coordinate system contained within the plane of the micromirror array. This mirror tilt pattern will produce an ovoid pattern on the plane of the micromirrors upon reflection, and a micromirror can access any point within the locus.

Figure 5:
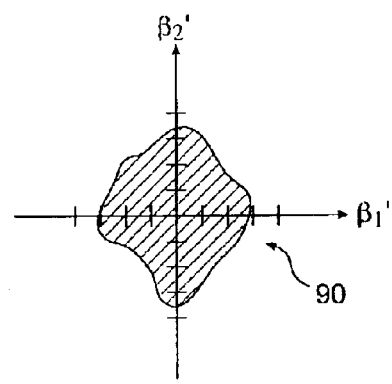
FIG. 5 is a graphical representation of a generalized tilt angle locus of a single micromirror.

FIG. 5 illustrates a generalized tilt angle locus 90 of a standard micromirror, where the $\beta 1$ axis and the $\beta 2$ axis also represent the tilt angles about orthogonal directions.

For any given locus, it is desirable to minimize the maximum tilt angle of the locus. An expression that can be used to generate the shape and size of the annular region is given as follows. (This shape is not necessarily optimal due to quantization and variation due to mirror placement.):

$$x = \frac{-2D\cos\alpha\cos\theta\sin\gamma(\cos\alpha\cos\gamma + \sin\alpha\sin\gamma\sin\theta)}{\sin\alpha\sin2\gamma\sin\theta - \cos\alpha(\cos2\alpha\cos2\gamma + 2\sin^2\alpha(1 - 2\sin^2\gamma\sin^2\theta))}$$

and $$y = \frac{D\sin\gamma(\cos^2\theta\sin2\alpha\sin\gamma - 2\cos\gamma\sin\theta)}{\sin\alpha\sin2\gamma\sin\theta - \cos\alpha(\cos2\alpha\cos2\gamma + 2\sin^2\alpha(1 - 2\sin^2\gamma\sin^2\theta))}$$

where x and y are the coordinates of that points in the $2^{nd}$ MEMS plane that define the boundary of the annular region;

D is the distance between the origin in the $1^{st}$ MEMS plane and the origin in the $2^{nd}$ MEMS plane;

α is the tilt angle of the MEMS plane with respect to the direction of propagation of the incident beamlets;

γ is the polar angle of tilt of a micromirror's normal with respect to the normal to the MEMS plane. (Note that the mirror's normal has unit magnitude, and its direction is specified in spherical coordinates.); and θ is the azimuthal angle in spherical coordinates of the micromirror's normal.

Coordinate transformation exists to relate the Cartesian rotations β1 and β2 to the polar rotations γ and θ parameters of the foregoing function.

For this space, zero degrees azimuth is defined parallel to the axis of rotation of the entire MEMS plane with respect to the direction of propagation of the incident beamlets.

The foregoing function is applied to each mirror, resulting in a different locus for each mirror. The function defines an ovoid which approximates the optimal locus of the boundary for placement of the two sets of mirrors. The mirror placements could be tweaked to permit slightly better optimization. This further optimization would address the discretization of mirror placement and variations in distances between mirror planes as viewed from different locations in the plane of mirrors.

The boundary to the annulus can be thought of as the intercept with the $2^{nd}$ MEMS plane of a beamlet reflected off a micromirror at the origin of the $1^{st}$ MEMS plane. As the micromirror tilts to positions given by γ and θ, the boundary will be defined by x(γ, θ) and y(γ, θ), as defined above. The MEMS plane tilt angle α is a parameter describing the overall system geometry, and does not vary for a given embodiment. The intercept for the nominal micromirror angle (γ=0) is the origin of the x, y coordinate system in the $2^{nd}$ MEMS plane. If the micromirror polar angle γ is constrained to a constant maximum value $\gamma_{max}$ for any azimuthal angle θ then the boundary to the annulus is ovoidal in shape. For small α and γ, the ovoid is nearly elliptical.

Referring again to FIG. 3, the invention further includes facilities for the parking of mirrors, i.e., the pointing of mirrors in selected directions when they are not intended to be active. When a beam impinges on an unintended mirror, there are issues of power dissipation and optical crosstalk. To mitigate these undesired effects, parking positions, or more accurately parking strategies, are established. Beams, whether or not active, must be directed to controlled locations. Static parking positions 82, 84 can be the target or parking positions for inactive beams. The parking targets can be absorbers, highly reflective diffusers, or static reflectors. They may be disposed, for example, inside the annulus as at 84 or at the periphery of the mirror array 54, as at 82. Each input mirror may be positioned to direct inactive beams to a different parking position. Or parking positions may be shared, so long as the dissipation is adequate. Beams directed at input mirrors inside the annulus can be directed to central position 84. Beams directed at input mirrors on the periphery can also be directed to central position 84. Beams directed at input mirrors inside the annulus can be directed to peripheral position 82. Beams directed at input mirrors on the periphery can be directed to peripheral position 82.

Alternatively, a parking strategy can be established whereby a mirror can be excited to orbit a beam along a meandering path 86 or 88. The meandering path 86 can be around the periphery of the annulus 59 or the meandering path 88 can be between the mirrors within the central array 61. The mirrors can be slewed slowly, as for a example with an orbit cycle of approximately 1 Hertz in frequency.

The invention has been explained with respect for specific embodiments. Other embodiments will be evident to those of ordinary skill in the art. Therefore, it is not intended that the invention be limited, except as indicated by the appended claims.

What is claimed is:

1. In a three-dimensional free-space optical switch including an array of fibers, means for creating collimated optical signals, an array of dual axis micromirror, in a mirror set, the improvement comprising:

a folded system with a static folding mirror such that only a single array of fibers and a single array of dual axis micromirrors are required; and a set of input micromirrors and a set of output micromirrors of said mirror set arranged in an ovoidal pattern wherein inner and outer boundaries of either the input micromirror set or the output micromirror set are disposed to define an ovoidal annulus and the complementary output micromirror set or the complmentary input micromirror set is disposed within the ovoidal annulus in order to globally minimize maximum tilt angles for a preselected locus of tilt angles of said micromirrors which are used to route optical signals.

2. The apparatus according to claim 1 wherein the locus of tilt angles of said micromirrors is circular to target within said ovoidal annulus.

3. The apparatus according to claim 1 wherein collimated optical signals between the fibers and the micromirrors are disposed to be in parallel.

4. The apparatus according to claim 1 wherein the input mirror set is inside the ovoidal annulus.

5. The apparatus according to claim 4 wherein a parking position is established at central positions in the micromirror set in order to reduce mirror tilt angle displacement upon activation.

6. The apparatus according to claim 4 wherein a parking position is established at peripheral positions in the micromirror set in order to reduce mirror tilt angle displacement upon activation.

7. The apparatus according to claim 1 wherein the output mirror set is inside the ovoidal annulus.

8. The apparatus according to claim 7 wherein a parking position is established inside the annulus in order to reduce mirror tilt angle displacement upon activation.

9. The apparatus according to claim 7 wherein a parking position is established at peripheral positions in the micromirror set in order to reduce mirror tilt angle displacement upon activation.

10. In a three-dimensional free-space optical switch including an array of fibers, means for creating collimated optical signals, an array of dual axis micromirrors in a mirror set, the improvement comprising:

a folded system with a static folding mirror such that only a single array of fibers and a single array of dual axis micromirrors are required; and a set of input micromirrors and a set of output micromirrors of said mirror set arranged in a pattern wherein either the input micromirror set or the output micromirror set is disposed along an annulus and the complementary output micromirror set or the complementary input micromirror set is disposed within the annulus in order to globally minimize maximum tilt angles for a preselected locus of tilt angles of said micromirrors which are used to route optical signals wherein a parking target is provided and selected from absorbers, highly reflective diffusers, and static reflectors.

11. In a three-dimensional free-space optical switch including an array of fibers, means for creating collimated optical signals, an array of dual axis micromirrors in a mirror set, the improvement comprising:

a folded system with a static folding mirror such that only a single array of fibers and a single array of dual axis micromirrors are required: and a set of input micromirrors and a set of output micromirrors of said mirror set arranged in a pattern wherein either the input micromirror set or the output micromirror set is disposed along an annulus and the complementary output micromirror set or the complementary input micromirror set is disposed within the annulus in order to globally minimize maximum tilt angles for a preselected locus of tilt angles of said micromirrors which are used to route optical signals wherein a parking strategy provides that optical signals directed to the input mirrors are orbited around a periphery of the micromirror set.

12. In a three-dimensional free-space optical switch including an array of fibers, means for creating collimated optical signals, an array of dual axis micromirrors in a mirror set, the improvement comprising:

a folded system with a static folding mirror such that only a single array of fibers and a single array of dual axis micromirrors are required; and a set of input micromirrors and a set of output micromirrors of said mirror set arranged in a pattern wherein either the input micromirror set or the output micromirror set is disposed along an annulus and the complementary output micromirror set or the complementary input micromirror set is disposed within the annulus in order to globally minimize maximum tilt angles for a preselected locus of tilt angles of said micromirrors which are used to route optical signals, wherein a parking strategy provided that optical signals directed to the input mirrors are orbited along a path between mirrors within the micromirror set.

13. In a three-dimensional free-space optical switch including an array of fibers, means for creating collimated optical signal, an array of dual axis micromirrors in a mirror set, the improvement comprising:

a folded system with a static folding mirror such that only a single array of fibers and a single array of dual axis micromirrors is required;

a set of input micromirrors and a set of output micromirrors of said mirror set arranged in an ovoidal pattern wherein inner and outer boundaries of either the input micromirror set or the output micromirror set are disposed to define an ovoidal annulus and the complementary output micromirror set or the complementary input micromirror set is disposed within the ovoidal annulus, the locus of the ovoidal annulus being given by:

$$x = \frac{-2D\cos\alpha\cos\theta\sin\gamma(\cos\alpha\cos\gamma + \sin\alpha\sin\gamma\sin\theta)}{\sin\alpha\sin2\gamma\sin\theta - \cos\alpha(\cos2\alpha\cos2\gamma + 2\sin^2\alpha(1 - 2\sin^2\gamma\sin^2\theta))}$$

and $$y = \frac{D\sin\gamma(\cos^2\theta\sin2\alpha\sin\gamma - 2\cos\gamma\sin\theta)}{\sin\alpha\sin2\gamma\sin\theta - \cos\alpha(\cos2\alpha\cos2\gamma + 2\sin^2\alpha(1 - 2\sin^2\gamma\sin^2\theta))}$$

where x and y are coordinates of points in the plane of the mirror met whereby the boundary of the ovoidal annulus is defined;

D is distance between the origin in the plane in the mirror set and the origin in image of the mirror set in the static fold mirror;

α is tilt angle of the plane of the mirror set with respect to direction of propagation of incident beamlets;

γ is polar angle of tilt of a normal of any micromirror with respect to normal to the plane of the mirror set; and θ is the azimuthal angle in spherical coordinates of said normal to the plane of the mirror set;

in order to globally minimize maximum tilt angles for a preselected locus of tilt angles of said micromirrors which are used to route optical signals.

* * * * *